No. 878,500.  
PATENTED FEB. 11, 1908.  
C. BROWNING, Jr.  
DEVICE FOR THE INSPECTION OF CAR WHEELS.  
APPLICATION FILED MAR. 15, 1907.  
5 SHEETS—SHEET 1.
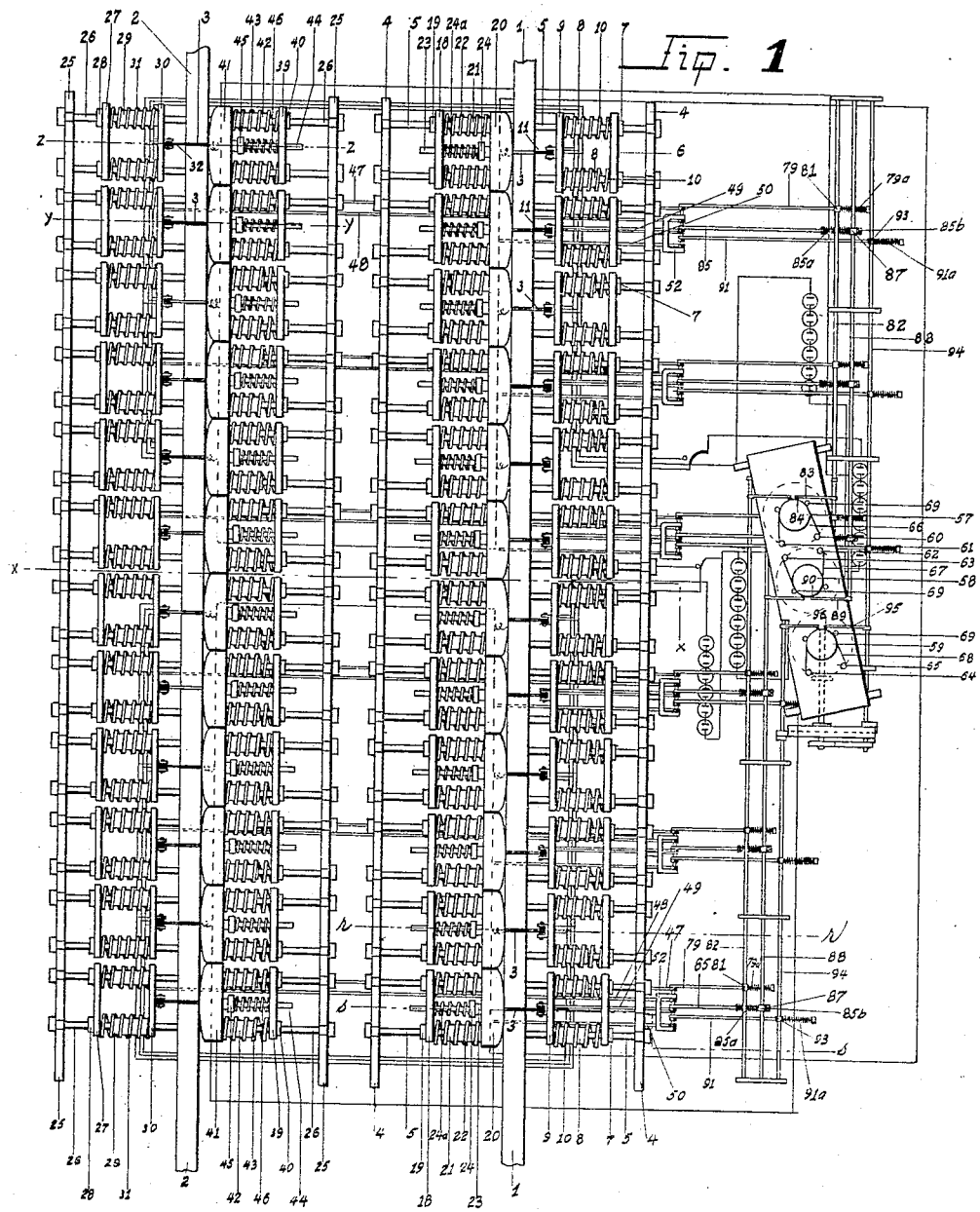
Witnesses  
Inventor  
Charles Browning, Jr.  
By Percy S. Webster  
Attorney

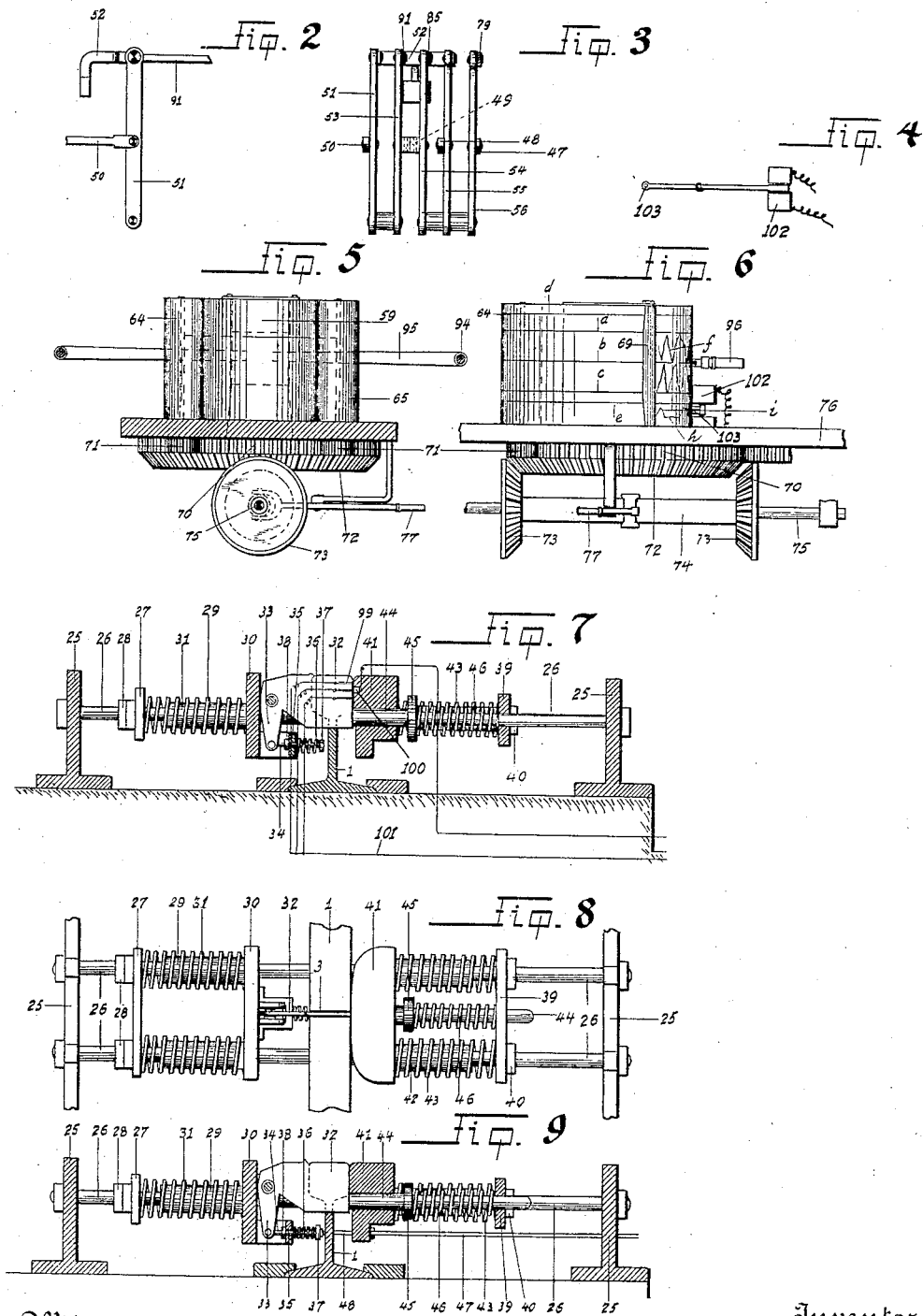

No. 878,500.
C. BROWNING, Jr.
PATENTED FEB. 11, 1908.
DEVICE FOR THE INSPECTION OF CAR WHEELS.
APPLICATION FILED MAR. 15, 1907.
5 SHEETS—SHEET 3.
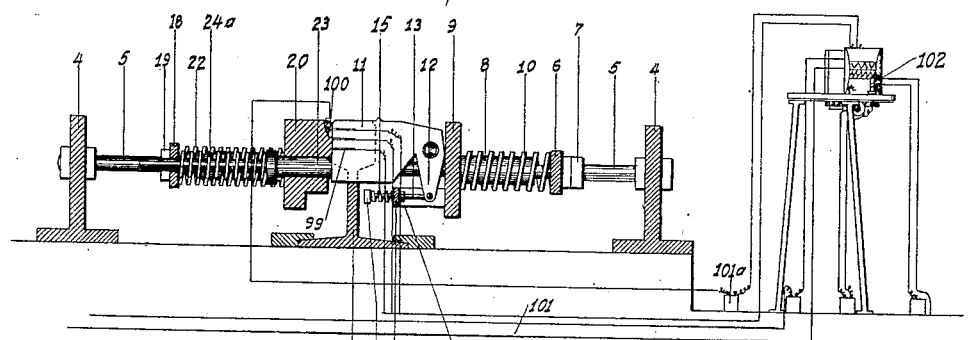
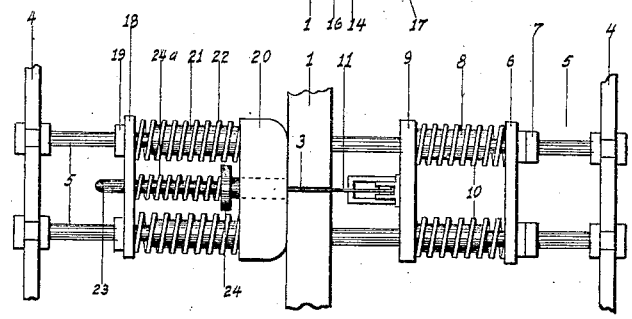
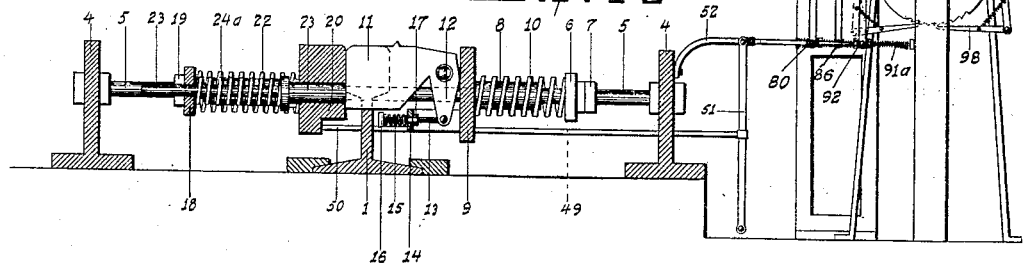

No. 878,500.
C. BROWNING, Jr.
PATENTED FEB. 11, 1908.
DEVICE FOR THE INSPECTION OF CAR WHEELS.
APPLICATION FILED MAR. 15, 1907.
5 SHEETS—SHEET 4.
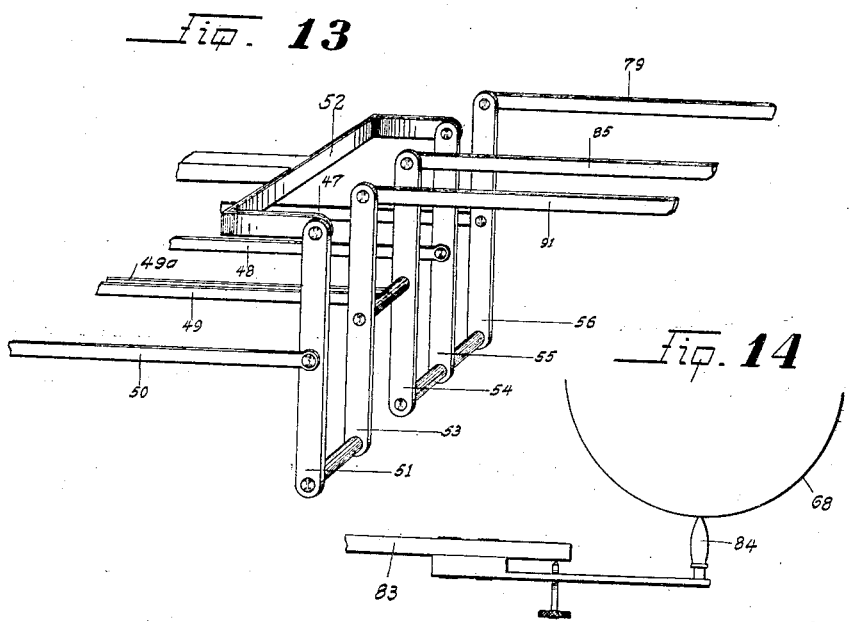
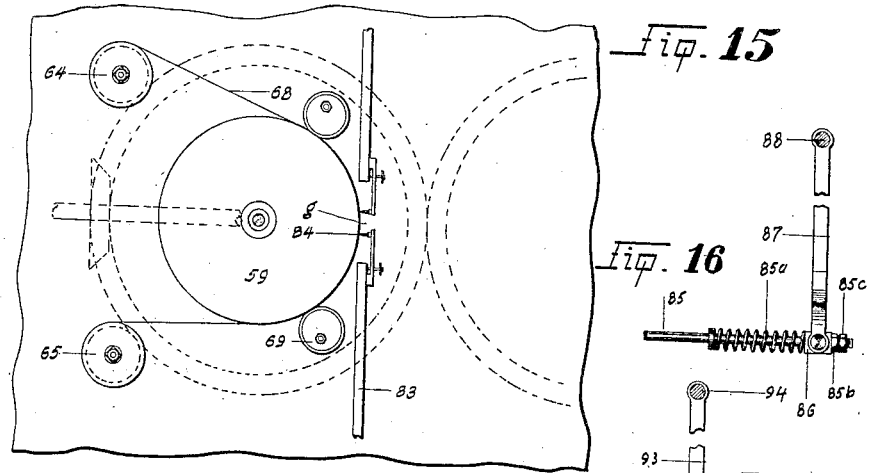
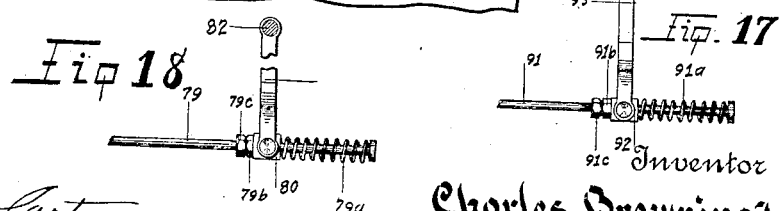
Witnesses
Frank N. Carter
J. B. Webster
Inventor
Charles Browning Jr.
By Percy S. Webster
Attorney No. 878,500.
PATENTED FEB. 11, 1908.
C. BROWNING, Jr.
DEVICE FOR THE INSPECTION OF CAR WHEELS.
APPLICATION FILED MAR. 15, 1907.
5 SHEETS—SHEET 5.
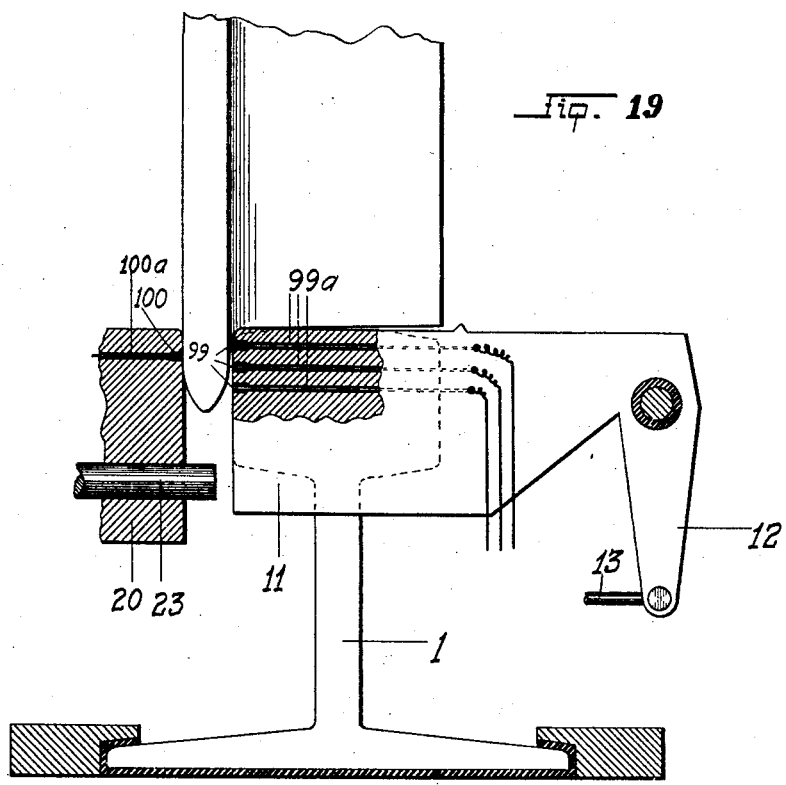

UNITED STATES PATENT OFFICE.

CHARLES BROWNING, JR., OF SACRAMENTO, CALIFORNIA.

DEVICE FOR THE INSPECTION OF CAR-WHEELS.

No. 878,500.  Specification of Letters Patent.  Patented Feb. 11, 1908.

Application filed March 15, 1907. Serial No. 362,519.

*To all whom it may concern:*

Be it known that I, CHARLES BROWNING, Jr., a citizen of the United States, residing at Sacramento, in the county of Sacramento and State of California, have invented certain new and useful Improvements in Devices for the Inspection of Car-Wheels; and I do declare the following to be a full, clear, and exact description of the same, such as will enable others skilled in the art to which it appertains to make and use the same, reference being had to the accompanying drawings, and the characters of reference marked thereon, which form a part of this specification.

This invention relates to improvements in the means or method of inspection of the flanges of car wheels and is particularly designed to detect those certain inherent or developed defects to be found in flanged wheels in use on power operated rail roads, the main object of the invention being to produce a more certain method for said inspection than is now possible, thus increasing the safety of the traveling public and also lessening the possibility of disastrous and expensive wrecks.

Further objects of the invention are as follows:—1. To furnish an accurate record of the conditions of the flanges of the car wheels under the cars, as they enter or leave a station, or in passing from one division to the next of the road, and to furnish this record by day or night in such a manner as to far surpass in certainty, rapidity and efficiency the usual method of inspection now in vogue. 2. To remove and overcome the difficulties of personal inspection as presented by the construction of modern cars. 3. To produce a device for the purpose which will record the conditions referred to compactly on paper and in such manner as to enable the same to be read and determined by a glance. 4. To produce a device which will enable the car inspectors to devote more time to the inspection of wheels and of cars for other defects not recorded by my improved device. 5. To produce a means for gaging the distance between two wheels on the same axle. These objects I accomplish by means of a series of spring actuated blocks arranged on one side of the rails of a railroad and by spring actuated plates inserted through slots in said rails, one plate being disposed opposite each block, said blocks and plates being adapted to close in on or caliper the flanges of the wheels; a lever mechanism connecting the alternate blocks and plates with a pencil recording mechanism adapted to record the movements of said blocks and plates on paper; also by means of electrical recording connections on the remaining blocks and plates whereby is automatically recorded on paper the vertical wear of the flanges when same exceeds any specified limit; also by such other and further construction and combination of parts as will render the device a working mechanical success; all as will appear by a perusal of the following specifications and claims.

In the drawings similar characters of reference indicate corresponding parts in the several views.

Figure 1 designates a complete top plan view of the device. Figs. 2 and 3 are detail views of lever mechanisms. Fig. 4 is a side elevation of an electric pencil mechanism. Fig. 5 is a rear elevation of a paper drum mechanism. Fig. 6 is a side elevation of the same. Fig. 7 is a view taken on a line $zz$ of Fig. 1. Fig. 8 is a top plan view of a block and plate flange calipering mechanism. Fig. 9 is a section taken on a line $yy$ of Fig. 1. Fig. 10 is a view taken on a line $ss$ of Fig. 1, showing mechanical connections only. Fig. 11 is a top plan view of a flange calipering mechanism. Fig. 12 is a view taken on a line $rr$ of Fig. 1 showing electrical connections only. Fig. 13 is a perspective view of a lever mechanism. Fig. 14 is a fragmentary view of a pencil mechanism. Fig. 15 is a top plan view of a paper drum mechanism. Figs. 16, 17 and 18 are side fragmentary views of spring adjustment mechanisms. Fig. 19 is a sectional view of a flange calipering mechanism showing a fragment of a wheel therein and electrical connections.

The defects which this device is designed to detect are as follows:—Flange missing wholly or in part. Flange worn to the limit of thickness in one or more places. Wheels out of gage at one or more points, due to wheel or wheels loose or shifted on axle, or originally pressed on out of gage, or due to bent or sprung axle or other causes. These defects I set forth at this point in order that the following specifications and claims may be more easily understood.

The main subdivisions of this invention are as follows:—1. The means for recording the condition of the width or thickness of flange, and the gage between wheels. 2. The means for recording the vertical wear of the flanges, that is the wear vertically on the curve of the flange from the lower part or root of flange outward toward the point of same.

In order to more fully elucidate the invention, I will set forth and describe each of the above subdivisions separately herein, it being understood that M. C. B. standard gage or other gage may be the criterion used in the inspection of the wheels.

Describing the first subdivision:—1 and 2 designate the rails of a railroad. In the section of said rails wherein is arranged the herein described system are a series or lateral slots 3, say twelve for instance. Arranged on each side of the rail 1 are T-irons 4. Secured in said T-irons are rods 5 extending from one of said irons to the other, through the web of the rail 1, one of said rods 5 being disposed on each side of each of the slots 3, for the purpose as will appear. Mounted on each couple of said rods 5 on the outside of the rail 1 are cross stop plates 6, the position thereof being regulated by means of nuts 7 mounted on said rods 5. Also mounted on said rods 5 on the outside of the rail 1 are sleeves 8 each couple carrying a cross member 9. Encircling said sleeves 8 and bearing between said cross members 9 and 6 are spiral springs 10. Pivotally mounted on the front of the cross members 9 are flat plates 11 extending through the slots 3, said plates having at their rear ends depending arms 12 having horizontal rods 13 extending through shoulders 14 held outward from the cross-members 9, there being spiral springs 15 encircling said rods 13 and bearing between stop heads 16 and on the ends of said rods and the shoulders 14, the tension of said springs 15 being regulated by nuts 16 while 17 is a stop nut. The function of said springs and nuts is to regulate the position of the plates 11 and hold the tops thereof level with or slightly above the top of the rail 1, and with any desired pressure, against the tread of each wheel in any train passing through the device. Mounted on each couple of said rods 5 on the inside of the rail 1 are cross stop plates 18, the position thereof being regulated by means of nuts 19 mounted on said rods 5. Also mounted on each couple of said rods 5 and disposed in alinement to the plates 11 are blocks 20 provided with sleeves 21 encircling said rods 5. Encircling said sleeves 21 and bearing between the stop plates 18 are spiral springs 22.

Arranged through the blocks 20 and the plates 18 and co-acting with the plates 11 are pins 23 provided with collars 24, said collars being disposed a sufficient distance from the blocks 20 to permit the flange of a wheel to get between the block 20 and plate 11 before the block 20 strikes the collar 24, thus pulling the pin 23 from engagement with the plate 19, thus preventing said flange from breaking said plate. There are springs 24$^a$ bearing between said collars 24 and the stop plates 18 to hold said pins in engagement with said plates.

The rail 2 is supplied with parts 25, 26, 27, 28, 29, 30, 31, 32, 33, 34, 35, 36, 37, 38, 39, 40, 41, 42, 43, 44, 45 and 46 similar in all respects to the description of parts 4, 5, 6, 7, 8, 9, 10, 11, 12, 13, 14, 15, 16, 17, 18, 19, 20, 21, 22, 23, 24 and 24$^a$, the same being designed by said numerals for the purpose of more fully elucidating the following description of a lever pencil recording mechanism. As this recording mechanism is being made the subject of another application for patent by me I will but briefly describe it in this specification in order to show the operation of this device. Describing said pencil recording mechanism a rod 47 is secured to every other one of the cross blocks 41 and extends through the outer one of the irons 4. Similar rods 48 and 50 and double rods 49 and 49$^a$ are secured to every other one of the members 30, 20 and 9 respectively. Rods 49 and 49$^a$ are double or two separate rods pivoted at same point to member 9. At the other end rod 49 couples to lever 53 and 49$^a$ to lever 54. The rods 50 are pivotally connected with levers 51 pivotally mounted on hangers 52 secured to the outer iron 4. The double rods 49 and 49$^a$ are pivotally connected to two levers 53 and 54 respectively, the levers 53 and 51 being pivoted together at their lower ends and the levers 54 having pivoted to their lower ends levers 55 to which are pivotally secured the rods 48, said levers 55 being pivoted at their upper ends to the hangers 52 and having pivoted to their lower ends levers 56 to which are pivotally connected the rods 47.

At this point it is proper to state that the above described mechanism is divided practically into two sections as at $x\,x$, Fig. 1, each section being devised for testing one half the wheel as will appear. The pencil recording mechanism which I will now describe will be elucidated as used in connection with one of said sections, it being understood that the same mechanism is used on each section. As before stated this recording mechanism is fully set forth in a pending application for patent, hence I will but briefly set the same forth herein to show the connection with the gaging mechanism described. This recording mechanism consists of a paper drum mechanism consisting of three main drums 57, 58 and 59, one for each set of levers in each section of the device as will appear. For the said main drum there are auxiliary drums 60 and 61 on each side and to the rear thereof. Similarly there are auxiliary drums 62—63 and 64—65 for the main drums 58 and 59 respectively. The papers 66—67 and 68 are rolled on the drums 60—62 and 64 respectively, thence around the drums 57—58 and 59 respectively and thence to the drums 61—63 and 64, the same being held in contact with the drums 57—58 and 59 by means of side rollers 69. Underneath the drums 57—58 and 59 and secured thereto are pinion wheels 70 intermeshing together and secured to the rollers 60—61—62—63 and 64 are smaller pinion wheels 71 intermeshing with the gears 70. 72 is a bevel gear secured to one of the gears 70 and intermeshing with smaller bevel gears 73 secured to a sleeve 74 operating on a shaft 75 journaled in the platform 76 holding the drum mechanism. 77 is a lever mechanism secured to the sleeve 74 for throwing the gears 73 alternately in or out of gear with the gear 73 as will appear. On the shaft 75 is a ratchet wheel 78 in connection with a lever mechanism hereafter described. The levers 53—54 and 56 are in operative connection with this paper drum mechanism in the following manner:—Levers 79 connect the levers 56 with swivel blocks 80 from which links 81 lead up to and are rigidly secured to a pencil rod 82 provided with an arm 83 carrying a pencil, pen or hod 84 engaging with the paper 66 on the drum 60, for the purpose as will further appear hereinafter. Levers 79 are provided with springs 79$^a$ and nuts 79$^b$ and jam nuts 79$^c$, for the purpose as will appear. Levers 85 connect the levers 54 with swivel joints 86 from whence links 87 lead up to and are rigidly secured to a pencil rod 88 provided with an arm 89 carrying a pencil, pen or hod, engaging with the paper 67 on the drum 58 for the purpose as will appear. Levers 85 are provided with springs 85$^a$ and nuts 85$^b$ and jam nuts 85$^c$ as shown, and for the purpose as will appear. Similarly levers 91 connect the levers 53 to swivel blocks 92 from whence links 93 lead up to and are rigidly secured to a pencil rod 94 provided with an arm 95 carrying a pencil, pen or hod 96 engaging with the paper 68 on the drum 59 for the purpose as will appear. Levers 91 are provided with springs 91$^a$ and nuts 91$^b$ and jam nuts 91$^c$ as shown, and for the purpose as will appear. The said rod 94 is also provided with an end arm 97 carrying a pawl finger 98 engaging with the ratchet wheel 78 for the purpose as will appear.

In practice the above described subdivision of the device operates as follows:—On the papers 66 and 68 are drawn lines $a$ and $b$, a middle line $c$ being the normal position of the pencils and the lines $a$ and $b$, indicating the minimum width of flange permitted. Likewise line $d$ and $e$ might be used to indicate maximum width of flange permitted. On the paper 67 are drawn similar lines indicating the minimum and maximum gage between wheels permitted.

I will now describe the method of testing the wheels at one point by way of example, all the rest of the mechanism operating in exactly the same manner.

When the wheels enter the device they first force the blocks 41 and 20 outward from rail, the pins 44 and 23 actuated by the springs 46 and 24$^a$, holding the plates 32 and 11 even with the rails 2 and 1 until the flange is between said blocks and plates when the blocks 41 and 20 engage with the collars 45 and 24 and force said pins back, permitting the plates to close in on the flange of the wheel. As the said flange passes between said blocks and plates as described the following occurs:—The plate 32 moves inward as described while the block 41 is forced outward as shown. This causes the rod 47 to push the floating lever 56 outward while the rod 48 pushes the lever 55 outward, also operating the lever 56 in or out, the movement of said lever 56 being conveyed by the lever 79 and link 81 to the pencil rod 82, thus rotating it and causing the pencil 84 to make on the paper 66 an upward mark such as $f$ in Fig. 6 of the drawings. This shows the condition as to thickness of the flange of the wheel at that one point between the plate 32 and block 41. As the lines $a$ and $b$ are disposed to show the minimum width of flange permitted, if the line $f$ falls below said line $a$ then the flange is so worn as to be condemned. As the rod 48 pushes on the lever 55 it also operates on the floating lever 54, and as the plate 11 moves inward onto the flange of the wheel on that side of the car the rod 49$^a$ also pulls on said lever 54 and the motion imparted to this lever by the rods 48 and 49$^a$ is transmitted to the lever 88 in a manner similar to that described above, the rotation of said lever 88 causing the pencil 90 to mark the gage between the two wheels, thus showing the condition thereof. The rod 49 pulls on the lever 53 while the rod 50 pulls on the lever 51 which also operates the lever 53, the motion of said lever 53 being transmitted as described to the lever 94, which marks on the paper 68 the condition of the flange at that point between the block 20 and plate 11. As the lever 94 rotates it causes the arm 97 to pull on the pawl 98 which rotates the ratchet wheel 78, which action causes the gears 73—72—71—70 etc., to operate, thus moving the papers on the drums ready for another mark.

The purposes of the springs 79$^a$, 85$^a$ and 91$^a$ and the nuts 79$^b$—85$^b$—91$^b$ and jam nuts 79$^c$—85$^c$ and 91$^c$ are as follows:—They permit of the thickness of the flanges and gage between wheels of being registered at one or more points by one pencil, by reason of the fact that when one set of blocks in motion is causing one set of levers 79—85—91 to rotate the pencil rods, the remaining levers slide through the swivel blocks and compress the said springs and when the action of said operating levers is finished the said springs force the swivels back to their normal position. This does away with the necessity of having a separate pencil for each point to be tested and recorded. The nuts and jam nuts serve for the purpose of regulating the position of the swivel blocks and the tension of said springs and as shoulders for said swivels to bear against the levers in action. The springs 85$^a$ and nuts 85$^b$ and 85$^c$ are disposed on the reverse side of the swivel blocks than are the others, for the reason that as described the levers 54 and 85 move only inward while the remaining rods move outward. The operation except as just stated, of all said parts, is similar in all respects.

The device may be so constructed that there may be as many blocks and plates as desired, testing the wheels at that number of points. The drawings in this case show three sets in each section of the device, thereby permitting the wheel to be tested at three different points in each section. The section described as working above is on the drawings that part above the line $xx$ Fig. 1. In practice the part below operates similarly with the exception that the pencil mechanism marks below the line $c$ the space $g$ (Fig. 15) between the pencils of each section, being figured so that when the papers travel that distance in marking the condition of one half each set of wheels the marking of the condition of the other half will be underneath the first markings, thus substantially dividing the markings according to the wheels, or in other words the marking of each half of each wheel will be under each other, thus marking the condition of the whole wheel of each set, and as the last pencil rod of the last section advances the paper as described, this will leave a small space between the markings of each set of wheels constituting a truck.

Describing the second subdivision of the device:—On the plates 11 and 32 intermediate of those carrying the pencil operating levers are electric contact points 99, the corresponding blocks 20 and 41 carrying opposite pole connections 100 disposed in positions intermediate the lines of any two of the points 99 so as not to close the circuit except as hereinafter described, said points being surrounded with suitable insulations 99$^a$ and 100$^a$. (See Fig. 19). Said connections 99 and 100 are connected with suitable batteries 101$^a$ by wires 101 and also to solenoids 102 on one of the papers 66—67 or 68, there being a pencil 103 in pivotal connection with said solenoid. The points 99 are so arranged that when the flange of the wheel is worn to the limit of vertical wear as described, they contact therewith and the points 100 complete the circuit to the solenoid 102, thereby causing the pencil 103 to leave its normal line $h$ and make a jog $i$, thus showing the flange to be worn to the limit of vertical wear, thereby subjecting it to condemnation.

This solenoid records the jogs as described in case the flange is worn to limit on either or both wheels of any pair of wheels passing through the device.

Thus it will be seen I have produced a device by means of which the thickness of the flanges of car wheels may be tested and recorded at any desired number of points; one by means of which the gage between wheels may be tested and recorded at any number of points; and last one by means of which the vertical wear of the flanges may be tested and recorded at any number of points. All the above being done automatically without need of personal inspection, all that is necessary for the inspector to do being to read the records on the paper drums, as described.

As mentioned herein this invention relates more particularly to and the claims define the plate and block calipering mechanism, the remaining parts of the device being fully covered in a pending application for patent.

While I in this specification set forth the present and preferred embodiment of my invention, in practice many small deviations therefrom may be resorted to at will without departing from the spirit of the invention.

Having thus described my invention what I claim as new and useful and desire to secure by Letters Patent is:—

1. In a device of the kind described a rail provided with one or more slots disposed laterally therein, and means operating in said slots for testing and recording the condition of car wheels, as set forth.

2. In a device of the character described a rail provided with one or more lateral slots therein, and means operating in said slots for automatically testing and recording the condition of car wheels, as specified.

3. In a device of the character described a rail provided with one or more lateral slots, plates arranged in said slots and means in operative connection with said slots for testing and recording the condition of car wheels, as specified.

4. In a device of the kind described a rail provided with one or more lateral slots, plates arranged in said slots, springs in operative connection with and regulating the position of said plates, and a recording mechanism in operative connection with said plates, as specified.

5. In a device of the kind described a rail provided with one or more lateral slots therein, spring actuated plates arranged in said slots, spring actuated blocks disposed in alinement with said plates on the opposite side of said rail, recording mechanism, and rods connecting said plates and blocks to said recording mechanism, as described.

6. In a device of the kind described, a section of a railroad, the rails thereof being provided with one or more lateral slots, those in one being in alinement with those in the other, T-irons on each side of each rail, rods arranged in said T-irons, one rod on each side of each of said slots, cross members slidably mounted on said rods, on one side of said rail, springs regulating the position of said cross members, plates pivotally mounted on said cross members of one side of said rail and extending into said slots, means for regulating the movement of said plates, blocks slidably mounted on said rods on the other side of said rail and engaging with said rail in alinement with said plates, springs regulating the position of said blocks, and means in connection with said blocks and plates for recording the movement thereof, as specified.

7. In a device of the kind described a section of a rail-road the rails thereof being provided with lateral slots, T-irons on each side of each rail, rods arranged in said T-irons on each side of each of said slots, cross members on each pair of said rods on the outer sides of said rails, springs regulating the position of said cross members, plates pivotally secured to said cross members and extending into said slots, depending arms at the rear of said plates, outwardly extending arms on said cross members, rods secured to said depending arms and extending through said outwardly extending arms, nuts on the outer ends of said rods, springs bearing between said nuts and said outwardly extending arms and encircling said rods, and means in operative connection with said plates for calipering car wheel flanges, and recording mechanisms in connection with said plates and said last named means, as set forth.

8. In a device of the kind described a section of a railroad, the rails thereof being provided with lateral slots therein, spring actuated plates arranged in said slots, blocks arranged in operative connection with said plates and means for holding said plates in a fixed position until said blocks describe a certain movement and means recording the movement of said blocks and plates, as set forth.

9. In a device of the character described a section of a railroad, the rails thereof being provided with one or more lateral slots therein, T-irons arranged on each side of each rail, a rod arranged in said T-irons on each side of each of said slots, spring actuated plates slidably arranged on said rods on the outer sides of said rails, said plates extending into said slots, blocks mounted on said rods on the inner sides of said rails in alinement with said plates, stop plates secured to said rods just back of said blocks, spiral springs encircling said rods and bearing between said blocks and said stop plates, pins extending through said blocks and said stop plates and engaging with said plates, collars on said pins disposed a desired distance from said blocks, springs encircling said pins and bearing between said collars and said stop plates, and means in connection with said plates and blocks for recording their movement, as specified.

10. In a device of the character described a section of a railroad, the rails thereof being provided with one or more lateral slots, spring actuated plates arranged in said slots, means for laterally adjusting said plates, means for regulating the lateral movement of said plates, means operating with said plates for calipering flanges of car wheels and means for recording the movement of such calipering mechanism, as described.

11. In a device of the character described a section of a railroad, the rails thereof being provided with one or more lateral slots and spring operated plates as described, and an attachment of electrical points on said plates to make contact with flanges of wheels passing, when said flanges reach any prescribed limit of wear, and means of recording said contact by solenoid operated pencils or pens, as described.

In testimony whereof I affix my signature in presence of two witnesses.

CHARLES BROWNING, JR.

Witnesses:
PERCY S. WEBSTER,
FRANK H. CARTER.